US006632078B2

(12) United States Patent
Ogg et al.

(10) Patent No.: US 6,632,078 B2
(45) Date of Patent: Oct. 14, 2003

(54) MOLD FOR A GOLF BALL

(75) Inventors: Steven S. Ogg, Carlsbad, CA (US); Donn A. Wilbur, Escondido, CA (US)

(73) Assignee: Callaway Golf Company, Carlsbad, CA (US)

( * ) Notice: Subject to any disclaimer, the term of this patent is extended or adjusted under 35 U.S.C. 154(b) by 49 days.

(21) Appl. No.: 09/683,279

(22) Filed: Dec. 7, 2001

(65) Prior Publication Data
US 2002/0037335 A1 Mar. 28, 2002

Related U.S. Application Data

(62) Division of application No. 09/442,845, filed on Nov. 18, 1999, now abandoned.

(51) Int. Cl.[7] .............................................. B29C 70/70
(52) U.S. Cl. ..................... 425/116; 425/125; 425/129.1
(58) Field of Search ................................ 425/116, 120, 425/125, 129.1

(56) References Cited

U.S. PATENT DOCUMENTS

| 1,595,409 A | * | 8/1926 | Kerr ............................ 425/12 |
| 4,501,715 A | | 2/1985 | Barfield et al. |
| 4,552,004 A | | 11/1985 | Barfield et al. |
| 4,653,758 A | | 3/1987 | Solheim |
| 4,959,000 A | | 9/1990 | Giza |
| 4,988,280 A | | 1/1991 | Giza |
| 5,005,838 A | | 4/1991 | Oka |
| 5,006,297 A | | 4/1991 | Brown |
| 5,122,046 A | | 6/1992 | Lavallee et al. |
| 5,147,657 A | | 9/1992 | Giza |
| 5,158,736 A | | 10/1992 | Giza |
| 5,190,294 A | | 3/1993 | Oka |
| 5,225,133 A | | 7/1993 | Ihara et al. |
| 5,406,043 A | | 4/1995 | Banji |
| 5,407,341 A | | 4/1995 | Endo et al. |
| 5,458,473 A | | 10/1995 | Banji |
| 5,720,676 A | | 2/1998 | Shimosaka et al. |
| 5,783,293 A | | 7/1998 | Lammi |
| 5,824,258 A | | 10/1998 | Yamaguchi |

(List continued on next page.)

FOREIGN PATENT DOCUMENTS

| JP | 08173576 A | * | 7/1996 | ........... A63B/45/00 |
| JP | 09048027 A | * | 2/1997 | ........... B29C/33/38 |
| JP | 10127826 A | * | 5/1998 | ........... A63B/45/00 |
| JP | 11137727 A | * | 5/1999 | ........... A63B/45/00 |
| JP | 2002159598 A | * | 6/2002 | ........... A63B/45/00 |
| WO | WO 98/19748 | | 5/1998 | |
| WO | WO 00/37229 | | 6/2000 | |

Primary Examiner—Robert Davis
(74) Attorney, Agent, or Firm—Michael A. Catania; Elaine H. Lo

(57) ABSTRACT

A golf ball mold having non-planar parting lines and a method for forming a cover using such mold are disclosed herein. The mold has a pair of mold halves, and each mold half has a non-planar perimeter. The non-planar perimeter has alternating extensions and indentations. Each of the extensions has an apex that may be curved, and each of the indentations has a depression that may be curved. The mold may be used in compression molding, injection molding and cast molding a layer on a golf ball. The mold may be used to produce golf balls having non-dimpled surfaces.

4 Claims, 4 Drawing Sheets

U.S. PATENT DOCUMENTS

| | | | |
|---|---|---|---|
| 5,827,135 A | * 10/1998 | Shimosaka et al. | 473/379 |
| 5,827,466 A | 10/1998 | Yamaguchi | |
| 5,849,168 A | 12/1998 | Lutz | |
| 5,874,038 A | 2/1999 | Kasashima et al. | |
| 5,879,599 A | 3/1999 | Inoue et al. | |
| 5,882,567 A | 3/1999 | Cavallaro et al. | |
| 5,947,844 A | * 9/1999 | Shimosaka et al. | 473/379 |
| 5,980,232 A | 11/1999 | Shimosaka et al. | |
| 5,997,417 A | 12/1999 | Lutz | |
| 6,019,921 A | 2/2000 | Lutz | |
| 6,024,551 A | 2/2000 | Yamaguchi | |
| 6,033,611 A | 3/2000 | Yamaguchi | |
| 6,033,724 A | 3/2000 | Molitor | |
| 6,050,803 A | 4/2000 | Omura et al. | |
| 6,063,319 A | 5/2000 | Dalton et al. | |
| 6,089,847 A | 7/2000 | Inoue et al. | |
| 6,093,360 A | 7/2000 | Inoue et al. | |
| 6,119,763 A | 9/2000 | Inoue et al. | |
| 6,123,534 A | 9/2000 | Kasashima et al. | |
| 6,123,628 A | 9/2000 | Ichikawa et al. | |
| 6,190,597 B1 | 2/2001 | Inoue et al. | |

* cited by examiner

MOLD FOR A GOLF BALL

CROSS REFERENCE TO RELATED APPLICATIONS

This application is a divisional application of U.S. patent application Ser. No. 09/442,845, filed on Nov. 18, 1999 and now abandoned.

FEDERAL RESEARCH STATEMENT

[Not Applicable]

BACKGROUND OF INVENTION

1. Field of the Invention

The present invention relates to molds for golf balls. More specifically, the present invention relates to a mold to impart an alternating parting line on a golf ball.

2. Description of the Related Art

Golf balls generally have either a one-piece construction or they may comprise several layers including a core, one or more intermediate layers and an outer cover that surrounds any intermediate layer and the core.

Golf balls are typically manufactured by various molding processes, whether one-component or multi-component balls. Generally, the core of the golf ball is formed by casting, compression molding, injection molding or the like. If an intermediate boundary layer is desired, one or more intermediate boundary layers are added over the core by any number of molding operations, including casting, compression molding, and/or injection molding. The cover is then formed over the core and intermediate boundary layers, if present, through casting, compression molding, or injection molding.

In an injection molding process, golf balls are typically created by the injection molding of a fluid stock material around a pre-formed core. In the case of a two-component golf ball, the fluid stock material is the cover material used for the golf ball. The injection molding process is also suitable for golf balls having one or more intermediate layers disposed between the core and the cover. Injection molding devices generally have two separate and mating hemispheric halves that form a cavity in which the golf ball is created. The injection mold also includes a plurality of retractable pins that hold the core in place while the fluid stock (intermediate layer material or cover material) fills the void between the core and the inside walls of the hemispheric mold halves. After the fluid stock of interest has finished entering this void and before the fluid stock has completely hardened, the retractable pins are withdrawn, and the fluid stock material fills the voids created by the retractable pins.

In cast molding, a themoset material is introduced into a mold half and allowed to partially cure before placement of a core therein. The mold half is then mated with an opposing mold half, and the mold is allowed to cure to form the cover.

In compression molding, two blanks are placed on a core and then this structure is placed within a mold. The blanks are then compression molded over the core to form a cover.

All of these traditional molds have a planar parting line that creates difficulties in placing dimples that intersect or lie on the equator of a golf ball.

U.S. Pat. No. 5,147,657, ('657 patent) issued to Giza discloses a mold device having an improved retractable pin mechanism. The mold includes two gates positioned at each pole of the mold cavity. See, e.g., FIG. 2 of '657 patent. This makes balancing less critical and reduces shifting of the core during molding operations.

As another example, U.S. Pat. No. 5,112,556 ('556 patent), issued to Miller discloses a molding apparatus for the manufacture of golf balls. The '556 patent discloses a mold that has an alignment means in the form of mating inclined surfaces for precise alignment of the mold halves during operation. In addition, one or more gates are positioned at one or more poles of the mold cavity so that no cold runners or flashings are formed on the golf ball that would require removal.

U.S. Pat. No. 5,122,046 ('046 patent), issued to Lavallee et al. discloses an injection mold device for a two-piece golf ball which, when removed form the mold, does not have any gate vestige and has only a minimal flashline around the ball. The mold of the '046 patent uses a plurality of tunnel gates on one of the hemispherical surfaces, wherein the tunnel gates are vertically offset from the parting line of the mold. See FIG. 3 of '046 patent.

U.S. Pat. No. 5,892,567 ('567 patent), issued to Cavallaro et al. discloses a method of making a golf ball having multiple layers. The '567 patent further discloses an injection molding device for forming golf balls. The injection molding device includes a mold having either edge gates (FIGS. 1 and 2), or sub-gates (FIG. 2(a)). The '567 patent teaches that edge gates allow the final golf balls to be connected and removed from the mold together.

One non-traditional mold process is disclosed in Solheim, U.S. Pat. No. 4,653,758 for a Golf Ball. As disclosed in Solheim, each of the mold halves have a rim with a wave configuration that has alternating lands and recesses. Each mold half of Solheim has five lands and five recesses that correspond to a pair of blanks that are compression molded to form a cover that has traditional dimples on the equator. The molds of Solheim must be used with the special blanks.

These current golf ball manufacturing processes continue to suffer from a number of disadvantages such as allowing for dimples on the equator, and being limited to traditional dimples for the surface of the golf ball. What is needed is a mold that allows for a surface pattern on the equator, whether traditional dimples or not, and a mold that is applicable to many molding processes.

SUMMARY OF INVENTION

The present invention is able to provide a novel solution to the problem of a planar parting line on a golf ball by redesigning a mold for forming the golf ball. The present invention accomplishes this solution by having a mold with mold halves that each have non-planar parting lines.

One aspect of the present invention is a mold for a golf ball having a first mold half and a second mold half. The first mold half has a body with an internal cavity and a perimeter having a non-planar surface with alternating extensions and indentations. There are at least ten extensions and at least ten indentations on the perimeter. The second mold half has a body with an internal cavity and a perimeter having a non-planar surface with alternating extensions and indentations. There are at least ten extensions and at least ten indentations on the perimeter of the second mold half. The extensions of the first mold half engage with corresponding indentations of the second mold half, and indentations of the first mold half engage with corresponding extensions of the second mold half.

Another aspect of the present invention is a mold for a golf ball having a first mold half and a second mold half. The first mold half has a body with an internal cavity and a perimeter having a non-planar surface with alternating extensions and indentations. Each of the extensions has a curved apex, and each of the indentations has a curved depression. The second mold half has a body with an internal cavity and a perimeter having a non-planar surface with alternating extensions and indentations. Each of the extensions has a curved apex, and each of the indentations has a curved depression. The extensions of the first mold half engage with corresponding indentations of the second mold half, and indentations of the first mold half engage with corresponding extensions of the second mold half.

Yet another aspect of the present invention is a method for forming a cover on a golf ball precursor product with a non-planar parting line. The method includes placing the golf ball precursor product in a first mold half. The first mold half has a body with an internal cavity and a perimeter having a non-planar surface with alternating extensions and indentations. The method also includes mating the first mold half with a second mold half. The second mold half has a body with an internal cavity and a perimeter having a non-planar surface with alternating extensions and indentations. The extensions of the first mold half engage with corresponding indentations of the second mold half, and indentations of the first mold half engage with corresponding extensions of the second mold half. The method also includes forming a cover on the golf ball precursor product with a non-planar parting line.

The method may also include introducing a castable material in semi-liquid or liquid form into each of the first mold half and the second mold half prior to placing the golf ball precursor product into the first mold half. Forming the cover may include curing the castable material into a cover. Forming the cover may alternatively include injecting an injectable material into a cavity formed by the mating of the first mold half and the second mold half with the golf ball precursor product within the cavity. Further, forming the cover may include compression molding a plurality of blanks about the golf ball precursor product.

It is a primary object of the present invention to provide a mold for a golf ball having a non-planar parting line.

It is an additional object of the present invention to provide a method for forming a golf ball with a non-planar parting line.

Having briefly described the present invention, the above and further objects, features and advantages thereof will be recognized by those skilled in the pertinent art from the following detailed description of the invention when taken in conjunction with the accompanying drawings.

DETAILED DESCRIPTION

Figure 1:
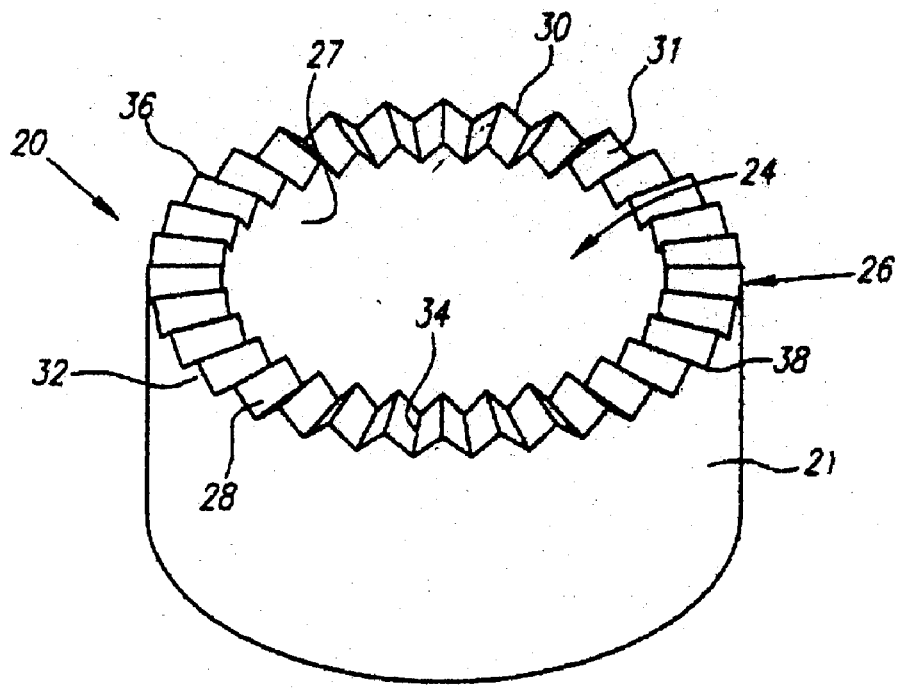
FIG. 1 is a top perspective view of a mold half of the present invention.
Figure 2:
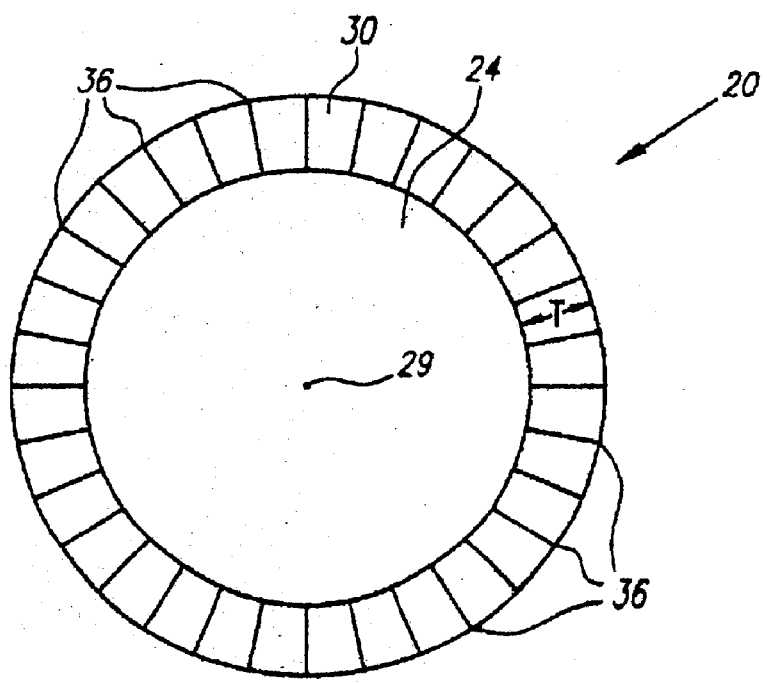
FIG. 2 is a top plan view of the mold half of FIG. 1.

As shown in FIGS. 1 and 2, a mold half is generally designated 20. The mold half 20 has a body 21 with an internal cavity 24 and a non-planar parting line 26. The surface 27 of the internal cavity 24 will have an inverse pattern for imparting a desired pattern onto a golf ball. The internal cavity 24 has a generally hemispherical shape with a radius that corresponds to the radius of a golf ball. The internal cavity 24 has a bottom center 29.

A wall 28 of the body 21 of the mold half 20 will have a thickness T that increases from top to bottom due to the curvature of the internal cavity 24. At the opening of the internal cavity 24 of the body 21 there is a perimeter 30. The perimeter 30 has a surface 31 with alternating extensions 32 and indentations 34. These alternating extensions 32 and indentations 34 provide the non-planar parting line 26 for the mold half 20. The number of extensions 32 and indentations 34 ranges from 10 to 70 of each, preferably from 15 to 50 of each, and most preferably from 30 to 40 of each. Alternatively, the perimeter 30 may be described as alternating upward and downward angled planar surfaces.

Each of the extensions 32 and each of the indentations 34 have a generally triangular shape. In a preferred embodiment, each of the extensions 32 has a curved apex 36, and each of the indentations 34 has a curved depression 38. As described in more detail below, the curved apices 36 and curved depressions 38 allow for greater durability of the mold half 20 in fabrication of golf balls.

Figure 3:
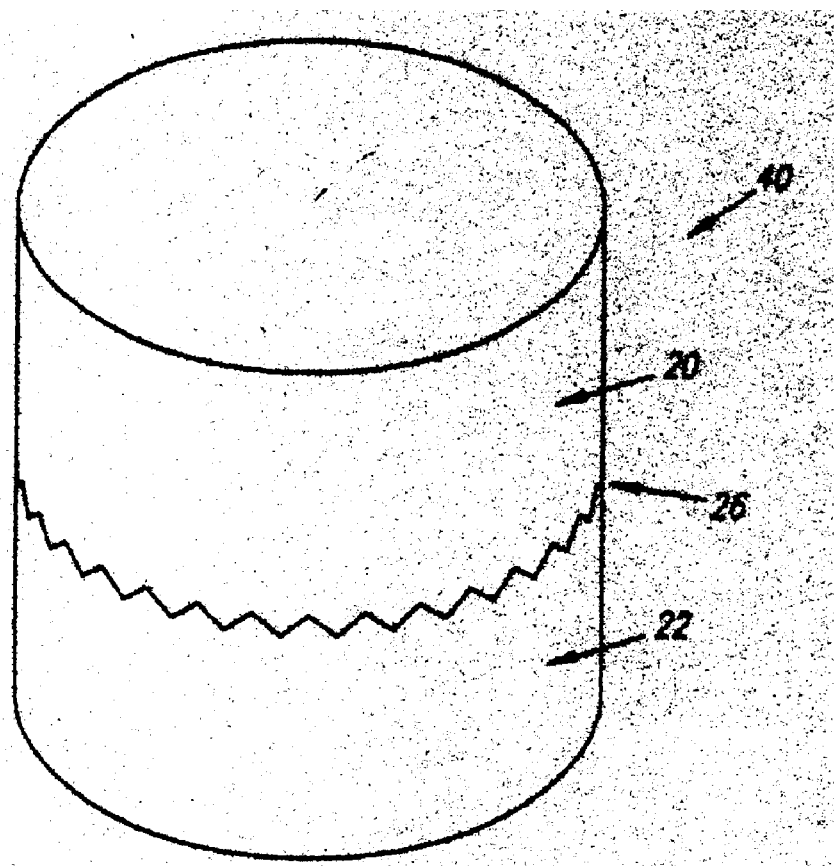
FIG. 3 is a side plan view of a mold of the present invention.
Figure 4:
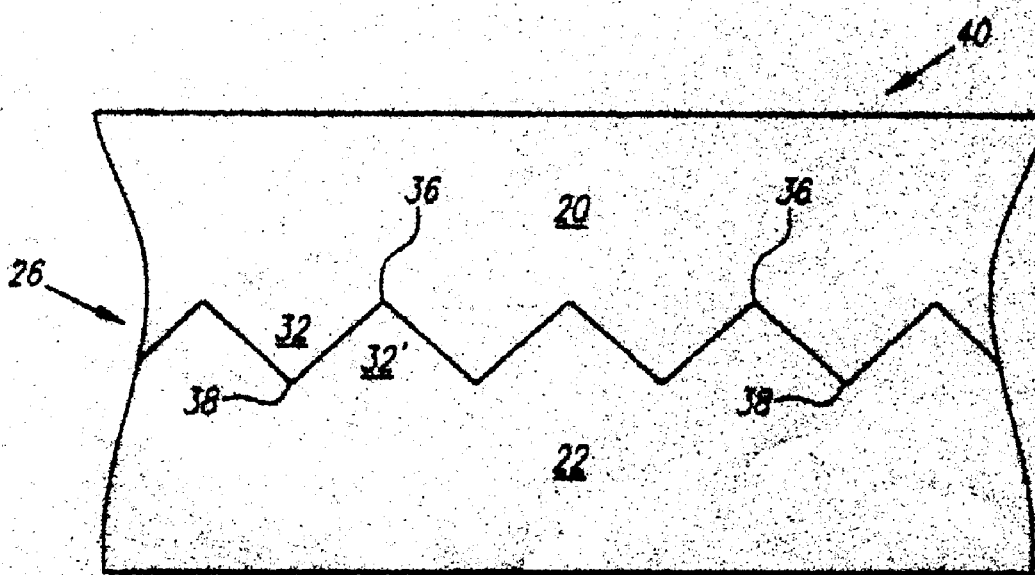
FIG. 4 is an enlarged view of the non-planar parting line of the mold of FIG. 3.

As shown in FIGS. 3 and 4, the mold half 20 is mated with a second mold half 22 to form a mold 40 with a non-planar parting line 26. Each of the extensions 32 of the first mold half 20 engage corresponding indentations 34' of the second mold half 22, and each of the extensions 32' of the second mold half 22 engage corresponding indentations 34 of the first mold half 20 to form a secure and relatively tight nesting of the mold halves 20 and 22.

Figure 5:
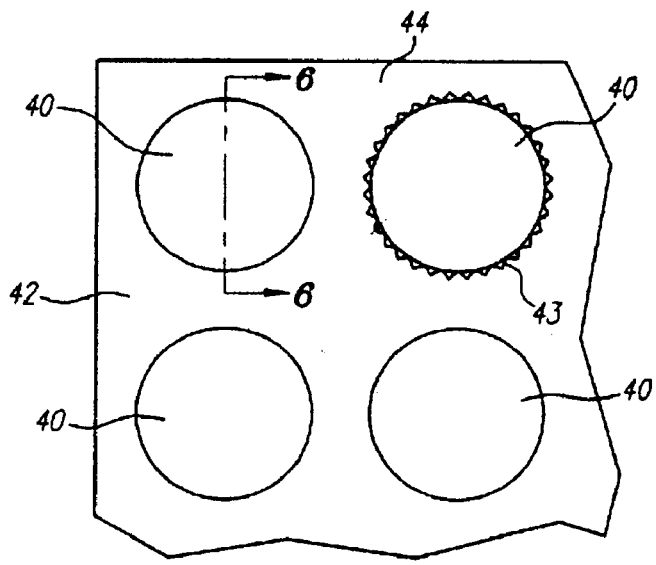
FIG. 5 is a top plan view of a mold base with molds of the present invention therein.

As shown in FIG. 5, several molds 40 are placed in a mold base 42 during the molding process. The mold base 42 will have cavities 43 for placement of the molds 40 therein. The cavities 43 will be separated by a body 44 of the mold base 42. The molds 40 with non-planar parting lines 26 of the present invention are preferably designed for cast molding a cover layer over a golf ball precursor product 46, not shown. However, the molds 40 with non-planar parting lines 26 of the present invention may also be utilized with injection molding and compression molding a cover over a golf ball precursor product 46.

Figures 6, 6A:
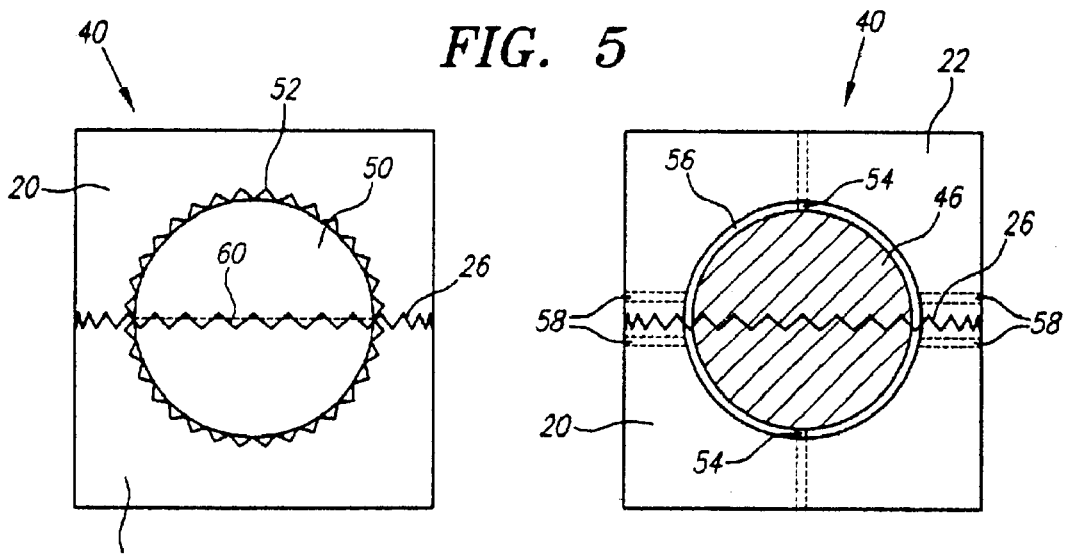
FIG. 6 is a cross-sectional view along line 6—6 of FIG. 5 of a mold of the present invention as utilized for cast molding.
FIG. 6A is a cross-sectional view of a mold of the present invention as utilized for injection molding.

In cast molding, a thermoset material in a semi liquid or liquid form is placed into each of the mold halves 20 and 22, and allowed to partially gel or cure. Then, a golf ball precursor product 46 is placed in the first mold half 20. The golf ball precursor product 46 may be a core, a core with windings, a core with a boundary layer, or the like. After the golf ball precursor product 46 is inserted into the first mold half 20, the second mold half 22, with the thermoset material therein, is mated with the first mold half 22 to from the complete mold 40 about a golf ball 50 as shown in FIG. 6. The mold 40 is then cured through heating and/or pressure in order to form a cover with a non-planar parting line on a golf ball. A preferred thermoset material is a thermoset polyurethane, however, those skilled in the art will recognize that other thermoset materials may be used without departing from the scope and spirit of the present invention.

In injection molding, each of the mold halves 20 and 22 has at least one retractable pin 54, as shown in FIG. 6A, to center the golf ball precursor product 46. Then, an injectable material is injected into the cavity 56 of the mold 40 through a series of gates 58. The injectable material fills the cavity 56 as the retractable pins 54 are retracted, and the injectable material cures about the golf ball precursor product 46 to create a cover with a non-planar parting line on a golf ball. A preferred injectable material is a thermoplastic material such as an ionomer material or a thermoplastic polyurethane, however, those skilled in the art will recognize that other injectable materials may be used without departing from the scope and spirit of the present invention.

Figure 6B:
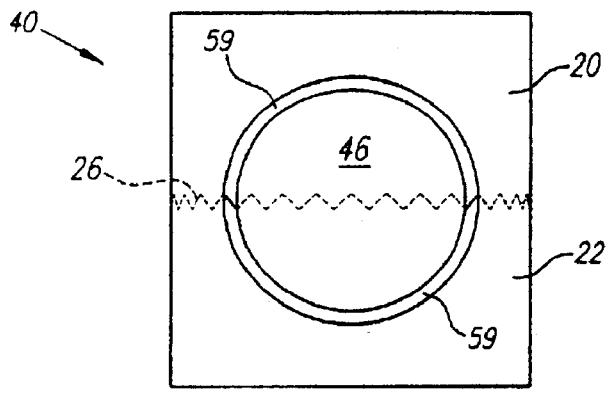
FIG. 6B is a cross-sectional view of a mold of the present invention as utilized for compression molding.

As shown in FIG. 6B, in compression molding, a plurality of blanks 59 composed of a compressible material are placed about a golf ball precursor product 46, and then the golf ball precursor product with the blanks 59 are placed within the mold 40. The blanks 59 are then compression molded, through heat and pressure, onto the golf ball precursor product 46 to form a golf ball with a cover having a non-planar parting line.

Figure 7:
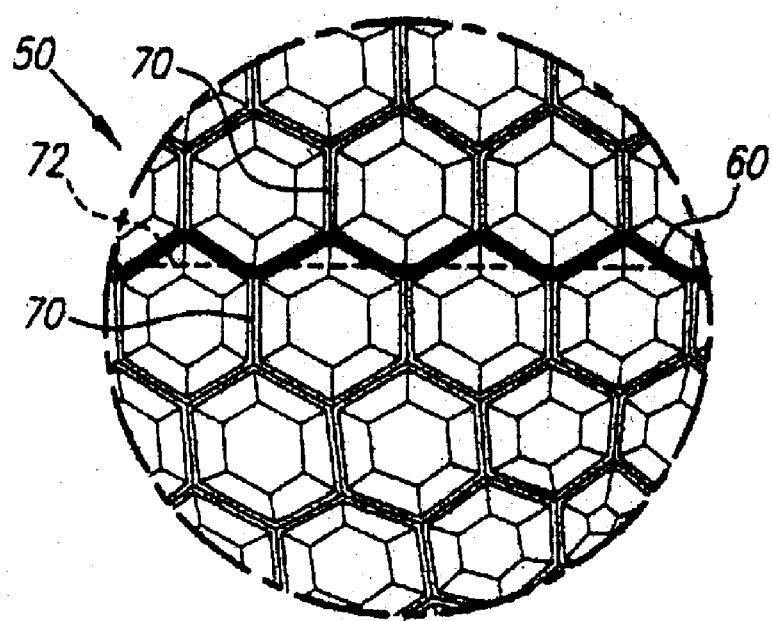
FIG. 7 is an enlarged equatorial view of a golf ball produced in a mold of the present invention.

FIG. 7 illustrates a non-planar parting line 60 of a golf ball 50, formed utilizing the mold 40 of the present invention, that has a plurality of tubular projections 70 that are interconnected to form a plurality of hexagons and pentagons. The non-planar parting line 60 corresponds to portions of each hexagon thereby allowing for hexagons to intersect or lie on the equator 72 of the golf ball 50. To produce such a golf ball 50, the surface 27 of the internal cavity 24 of each of the mold halves 20 and 22 has indentations 52, as shown in FIG. 6, corresponding to the tubular projections 72 in order to produce such a surface pattern on a golf ball 50. A more detailed explanation of such a golf ball 50 is disclosed in U.S. Pat. No. 6,290,615, entitled A Golf Ball Having A Tubular Lattice Pattern, and hereby incorporated by reference in its entirety.

Figure 8:
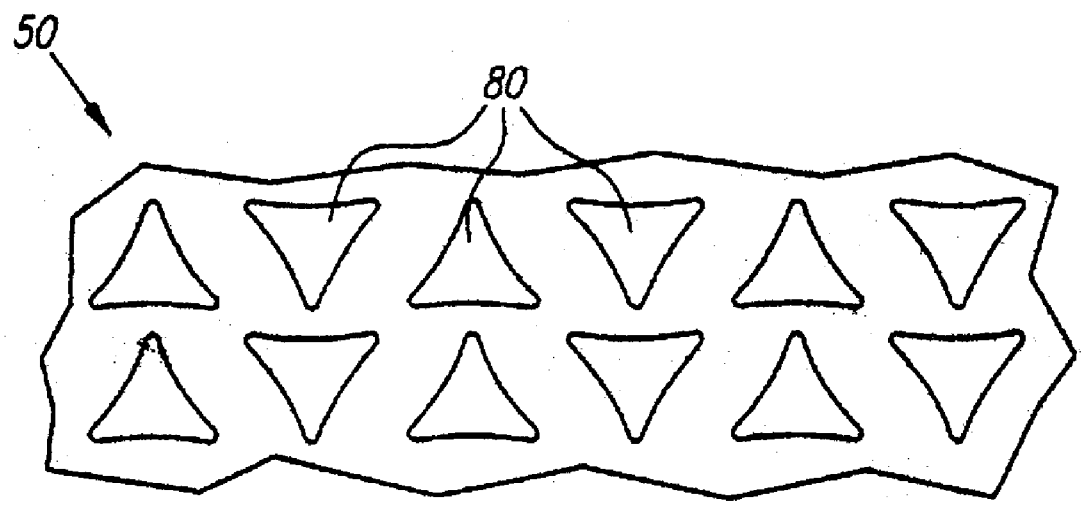
FIG. 8 is an enlarged equatorial view of an alternative golf ball produced in a mold of the present invention.

FIG. 8 illustrates a non-planar parting line 60' of a golf ball 50', formed utilizing the mold 40 of the present invention, that has a plurality of pyramidal projections 80. The non-planar parting line 60' corresponds to points of each pyramidal projection 80 thereby allowing for pyramidal projections 80 to intersect or lie the equator 72' of the golf ball 50'. To produce such a golf ball 50', the surface 27 of the internal cavity 24 of each of the mold halves 20 and 22 has indentations, not shown, corresponding to the pyramidal projections 80 in order to produce such a surface pattern on a golf ball 50'. A more detailed explanation of such a golf ball 50 is disclosed in co-pending U.S. patent application Ser. No. 09/442,860, entitled A Golf Ball With Pyramidal Protrusions, filed on Nov. 18, 1999, and now U.S. Pat. No. 6,383,092 and hereby incorporated by reference in its entirety.

Those skilled in the relevant art will recognize that golf balls with traditional dimple patterns may also be produced with the mold 40 with a non-planar parting line 26 of the present invention.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A mold for casting a thermosetting polyurethane cover for a golf ball, the mold comprising:

a first mold half comprising a body having an internal cavity with an inverse pattern for a thermosetting polyurethane golf ball cover and a perimeter having a non-planar surface with alternating extensions and indentations, wherein there are from 30 to 40 extensions and from 30 to 40 indentations; and a second mold half comprising a body having an internal cavity and a perimeter having a non-planar surface with alternating extensions and indentations, wherein there are from 30 to 40 extensions and from 30 to 40 indentations;

wherein each of the extensions of the first mold half and the second mold half has triangular shape with a curved apex, and each of the indentations of the first mold half and the second mold half has triangular shaped with a curved depression;

whereby extensions of the first mold half engage with corresponding indentations of the second mold half, and indentations of the first mold half engage with corresponding extensions of the second mold half.

2. The mold according to claim 1 wherein each extension of the first mold half and the second mold half corresponds to a portion of a hexagon of a plurality of hexagons on a golf ball.

3. The mold according to claim 1 wherein each extension of the first mold half and the second mold half corresponds to an edge point of a pyramidal projection of a plurality of pyramidal projections on a golf ball.

4. The mold according to claim 1 wherein the perimeter has a wall with a thickness in the range of 0.75 inches to 2.00 inches.

* * * * *